United States Patent Office
3,679,365
Patented July 25, 1972

3,679,365
METHOD FOR THE AUTOMATIC COUNTING OF THE SOMATIC CELLS IN MILK, AND NOVEL REACTION REAGENT FOR USE THEREWITH
Karl B. Wrightman, New City, and Hans Zehnder, Pound Ridge, N.Y., assignors to Technicon Instruments Corporation, Tarrytown, N.Y.
Filed Jan. 29, 1970, Ser. No. 12,515
Int. Cl. G01n 33/04
U.S. Cl. 23—231
20 Claims

ABSTRACT OF THE DISCLOSURE

New and improved, automatic method and apparatus for the clarification of milk attendant the counting of the somatic cells therein by cell counter means, and a novel reaction reagent for use therewith, are provided and comprise means to supply a stream of a series of different milk samples and continuous streams of a reaction reagent and fixative for milk sample-reaction reagent mixture, and means to treat the mixture to effect the clarification reaction and clarify the milk whereupon the latter may be supplied to automatic cell counter means for somatic cell counting and provision of a permanent cell count record.

BACKGROUND OF THE INVENTION

(1) Field of the invention

This invention relates to new and improved method and apparatus for the automatic clarification of milk attendant the counting of the somatic cells contained therein, and a novel reaction reagent for use therewith.

(2) Description of the prior art

A problem of increasing urgency is presented by the necessity for testing milk prior to human consumption thereof to determine whether or not the dairy cow which provided the milk is infected with mastitis, an infectious disease amongst dairy cattle herds, the disadvantageous effects of which are currently becoming better understood. In the event that the dairy cow in question is infected with mastitis, it may be understood that those skilled in this art strongly consider the milk from said dairy cow to be unfit for human consumption. More specifically, it may be understood that, for example, the Public Health Service of the United States Government has proposed public health standards to take effect in July 1970 which are believed to require that a sample of milk from each milking of each dairy cow be competently tested for mastitis determination before such milk is made available for human consumption, and that such milk be declared unfit for human consumption if such determination is positive.

Most frequently, the mastitis determination is based upon a counting of the number of somatic cells—which in milk consist mainly of white blood and epithelial cells— per measured volume of the milk, which count is then compared against an accepted standard to make the determination of interest. By way of example, it may be understood that a somatic cell count of 0 to 500,000 per cc. of milk tested is believed indicative of a normal dairy cow which is not infected with mastitis, while a somatic cell count of over 1,000,000 per cc. of milk tested is believed clearly indicative of a diseased dairy cow which is infected with mastitis.

Traditionally, somatic cell counting in milk has been accomplished by an extremely laborious, substantially manual procedure which required a number of time consuming and attention demanding milk preparation steps, and the subsequent direct optical counting of the somatic cells through the use of well known microscope techniques. Quite obviously, somatic cell determination through use of such methods requires the expenditures of large amounts of time by skilled technicians with the result that the cost per determination becomes inordinately high. Too, it may be readily understood that the mentally and physically fatiguing effects of long hours of such testing on the technicians involved, and the significant chance of error inherent in cell counting by the slide and microscope technique in the absence of extreme alertness and attention to detail on the part of the technician doing the counting, combine, in many instances, to render the results somewhat less than accurate.

In recent years, the significant problems inherent in the counting of somatic cells in milk by use of the above-described method have been alleviated somewhat by the substitution of an electronic cell counter for the microscope apparatus to effect the actual somatic cell counting with satisfactorily accurate results in the manner described, for example, in such greater detail in the article "Electronic Counting of Somatic Cells in Milk" by R. B. Read et al. as appears in pages 669 to 674 of volume 50 of the Journal of Dairy Science of May 1967.

Nothwithstanding this step forward, however, a particularly laborious, time consuming and attention demanding procedure, involving centrifugation, dilution, manual separation, washing, and re-suspension and the like, is required for the preparation of the milk to enable suitable somatic cell counting by the use of an electronic cell counter, whereby may be readily understood that somatic cell counting in milk through use of the methods and apparatus of the prior art remains an inordinately time consuming and expensive procedure, and that the already overburdened capabilities of such prior art method and apparatus will become even more overburdened as the proposed requirements for substantially increased somatic cell counting in milk discussed hereinabove become effective.

OBJECTS OF THE INVENTION

It is, accordingly, an object of this invention to provide new and improved automatic method and apparatus for the clarification of milk attendant the accurate counting of the somatic cells therein by automatic cell counter means.

Another object of this invention is the provision of a novel reaction reagent for use in such method and apparatus to render the somatic cells therein accurately detectable by automatic cell counter means.

Another object of this invention is the provision of a novel fixative for use in such method and apparatus to prevent somatic cell destruction by said reaction reagent.

Another object of the invention is the provision and apparatus as above which enable the counting of somatic cells in milk samples at substantially decreased time and cost per milk sample somatic cell count.

A further object of this invention is the provision of apparatus as above which require the use of only readily available components of proven dependability in the fabrication thereof whereby long periods of satisfactory, maintenance-free operation thereof are assured.

SUMMARY OF THE INVENTION

As currently preferred, the new and improved method and apparatus of the invention comprise the automatic supply of a stream of a series of milk samples to sample treatment and analysis means, the automatic mixture with said stream of a novel reaction reagent and a novel fixative, the automatic treatment of the resultant reaction reagent-milk sample-fixative mixtures to complete the clarification reaction and clarify the respective milk samples to enable the accurate counting of the somatic cells therein by automatic cell counter means, and the provision of a readily interpretable and reproducible record of such counting.

BRIEF DESCRIPTION OF THE DRAWINGS

The above and other objects and significant advantages of this invention are believed made clear by the following detailed description thereof taken in conjunction with the accompanying drawings wherein.

DETAILED DESCRIPTION OF THE INVENTION

Figure 1:
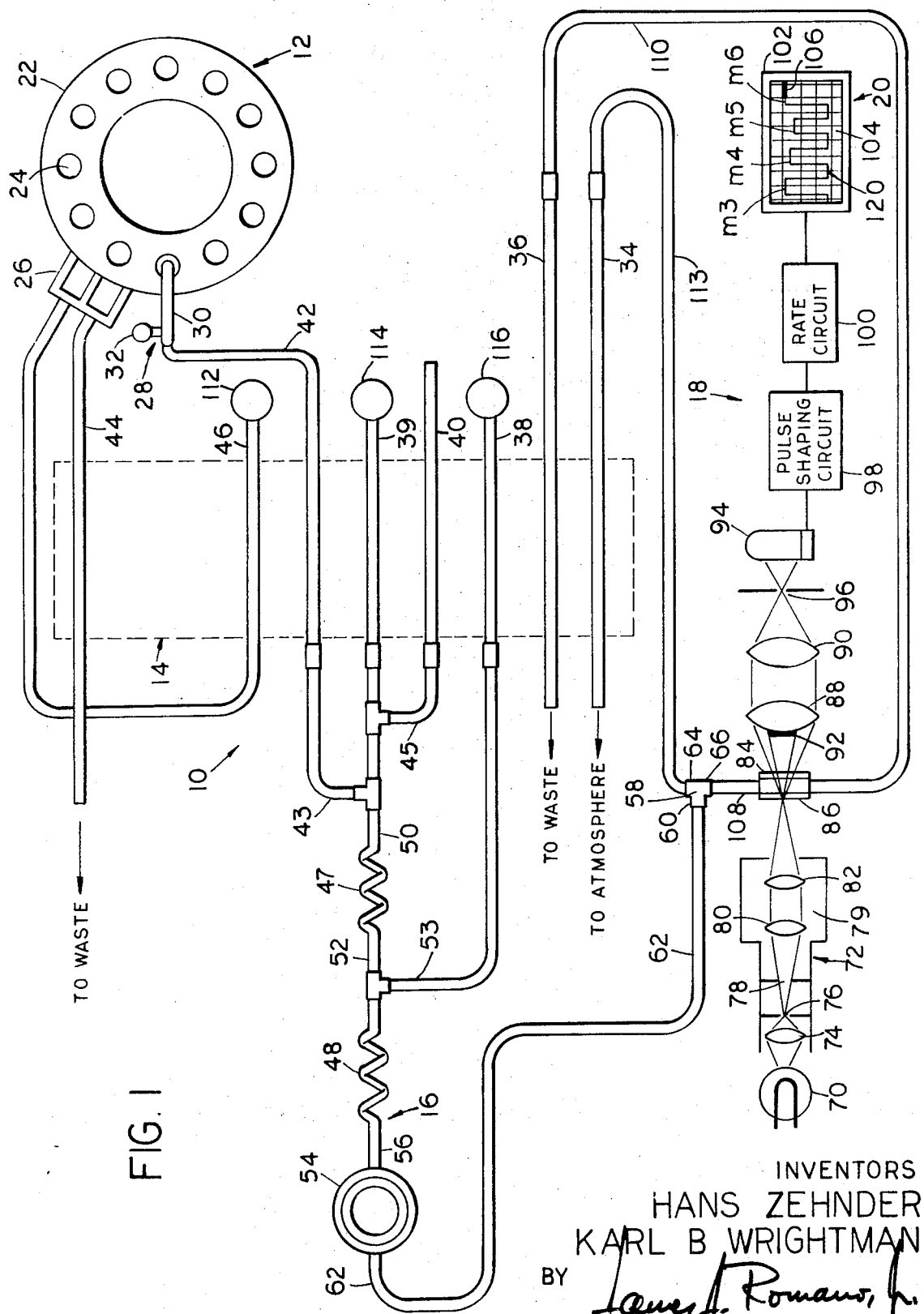
FIG. 1 is a flow diagram illustrating a method and apparatus in accordance with the teachings of this invention.

New and improved apparatus constructed and operative in accordance with the teachings of this invention are indicated generally at 10 in FIG. 1 and may be seen to comprise sample supply means as indicated generally at 12, sample pump means as indicated generally at 14, sample treatment means as indicated generally at 16, sample analysis means as indicated generally at 18, and sample analysis results recorder means as indicated generally at 20, respectively.

The sample supply means 12 may, for example, take the general form of those shown and described in United States Patent 3,134,263 issued May 26, 1964, to E. B. M. De Jong and, as such, comprise a turntable 22 from which are supported a plurality of sample containers 24 arranged thereon as shown. A wash liquid receptacle which contains a suitable apparatus wash liquid in the nature, for example, of water of clinical purity, is indicated at 26 and is disposed as shown adjacent the turntable 22.

A sample pick-up device is indicated generally at 28 and comprises a sample off-take tube 30 which is movable by operating means 32 between the depicted position thereof wherein the inlet end of the off-take tube 30 is immersed in a sample container 24 to another position thereof wherein the said inlet end is immersed in the wash liquid receptacle 26.

In operation, the turntable 22 is intermittently rotated, or indexed, to present each of the sample containers 24 in turn to the sample off-take device 28, while the latter is operated to immerse the inlet end of off-take tube 30 in a thusly presented sample container for a predetermined period of time to aspirate (as described in detail hereinbelow) a measured volume of the sample therefrom, to then transfer the said off-take tube inlet end through the ambient air for immersion in the wash liquid receptacle for a predetermined period of time to thus aspirate a measured volume of ambient air followed by a measured volume of said wash liquid, and to then again transfer the said off-take tube inlet end through the ambient air for immersion in the next presented sample container 24 for a predetermined period of time to thus aspirate another measured volume of ambient air and commence the aspiration of a measured volume of the sample from said next presented sample container.

The pump means 14 may, for example, take the form of the peristaltic proportioning pump shown and described in United States Patent 3,227,091 issued Jan. 4, 1966 to Jack Isreeli et al. and, as such, may be understood to comprise a plurality of compressible, elastic pump tubes 34, 36, 38, 39, 40, 42, 44 and 46 which are progressively compressed or occluded by a series of substantially equally spaced pump rollers (not shown) in the direction from right to left as seen in FIG. 1 to pump fluids through the said pump tubes at respective, substantially constant predetermined flow rates at relatively determined, in each instance, by the respective compressible pump tube internal diameter.

The outlet of compressible pump tube 46 is connected as shown to the inlet of the wash liquid receptacle 26, while the outlet of the latter is connected as shown to the inlet of compressible pump tube 44, the outlet of which extends as indicated to waste.

The respective outlets of compressible pump tubes 39, 40, and 42 are merged as shown into a conduit 50 by junction conduits of T-fittings as indicated at 43 and 45.

The sample treatment means 16 comprise mixing coils 47 and 48 which are connected as shown in series to the outlets of compressible pump tubes 39, 40 and 42 by a conduit 52. The outlet from compressible pump tube 38 is merged as shown into conduit 52 by a junction conduit or T-fitting as indicated at 53. A heating bath which may be understood to comprise temperature control means to maintain the temperature thereof at a substantially constant predetermined level, is indicated at 54, and the inlet thereof is connected as shown to the outlet of the mixing coil 48 by a conduit 56.

A T-fitting which forms debubbler means as described hereinbelow is indicated at 58 and comprises an inlet conduit 60 connected as shown to the outlet of heating bath 54 by a conduit 62, a gas outlet conduit 64 connected as shown to the inlet of compressible pump tube 34, and a liquid outlet conduit 66, respectively.

The sample analysis means 18 preferably take the form of reverse dark field optical counter means which, as depicted schematically in FIG. 1, comprise a suitable light source 70, and light focusing means 72 which include a condensing lens 74, an aperture 76, baffle 78 and a 5:1 demagnification microscope objective 79 having lenses 80 and 82 relatively disposed as shown.

A sample particle counter flow cell which is, of course, made from any suitably transparent material in the nature of glass, is indicated at 84, and comprises a sample inspection volume of precise dimension as generally indicated at 86.

Collecting lenses are indicated at 88 and 90, and a dark stop 92 is disposed as shown generally centrally of the former. A photomultiplier tube is indicated at 94 and a photomultiplier tube aperture is indicated at 96.

The pulse output from the photomultiplier tube 94 is applied as shown to a pulse shaping circuit 98 and a rate circuit 100, and the rate output of the latter is applied as shown to operate the null balance type D.C. strip chart recorder 102 which constitutes the sample analysis results recorder means 20. Such recorder may, for example, take the form of that shown and described in United States Patent 3,241,432 issued Mar. 22, 1966 to Dr. Leonard T. Skeggs and assigned to the assignee hereof and, as such, will comprise a driven strip chart 104 upon which the sample analysis results are provided by means of a recorder pen or stylus 106.

The liquid outlet conduit 66 of the T-fitting 58 is connected as shown by a conduit 108 to the inlet of the cell 84, while the outlet of the latter is connected as shown by conduit 110 to the inlet of the compressible pump tube 36, with the outlet of the latter extending as indicated to waste. The gas outlet conduit 64 of the T-fitting 58 is connected as shown by conduit 113 to the inlet of the compressible pump tube 34, and the outlet of the latter extends as indicated to atmosphere.

The inlet end of compressible pump tube 42 is connected as shown to the outlet end of the sample off-take tube 30, while the inlet end of compressible pump tube 40 is left open to atmosphere.

The inlet end of compressible pump tube 46 is immersed as indicated in a container 112 of a suitable wash liquid as discussed above, while the inlet end of compressible pump tube 39 is immersed as indicated in container 114 of a suitable fixative, and the inlet end of compressible pump tube 38 is immersed in a container 116 of a suitable reaction reagent, it being understood that the function of said fixative is to substantially inhibit the acceleration of the lysis or destruction of the somatic cells as might otherwise be caused by the addition of the reaction reagent to said milk samples.

Referring now in greater detail to said reaction reagent, the same may, as currently preferred, be understood to be constituted by a blend of a saponification reagent which is in turn a combination of an amine and a strong base, a chelation agent, and a dispersant which are respectively preferably constituted and prepared as follows:

SAPONIFICATION REAGENT (A) Hydroxylamine hydrochloride ($H_2NOH \cdot HCl$) about 12% in absolute methanol.

(B) Potassium hydroxide (KOH) about 35% in absolute methanol.

(C) $H_2NOH$—KOH reagent.—Combine about 2 volumes of about 35% KOH (B above) with about 5 volumes of about 12% $H_2NOH \cdot HCl$ (A above). Add a few drops of 35% KOH to insure complete precipitation and filter.

CHELATION AGENT (D) (Ethylenedinitrolo) tetraacetic acid, tetrasodium salt (EDTA) about 20% in water.

DISPERSANT (E) Octylphenoldecaethyleneglycolether, marketed as Triton–X–100, about 50% in methanol.

Alternatively, said saponification reagent may be constituted and prepared as follows:

SAPONIFICATION REAGENT (A) Hydroxylamine hydrochloride ($H_2NOH \cdot Cl$) about 12% in absolute methanol.

(B) Sodium hydroxide (NaOH) about 50% in absolute methanol.

(C) $H_2NOH$—NaOH reagent.—Combine about 2 volumes of about 50% NaOH (B above) with about 5 volumes of about 12% $H_2NOH \cdot HCl$ (A above). Add a few drops of 50% NaOH to insure complete precipitation and filter.

Alternatively, said chelation agent may be constituted and prepared as follows:

CHELATION AGENT (D) Mercaptoacetic acid, about 20% in water; or (D) ascorbic acid, about 20% in water.

Alternatively, said dispersant may be constituted and prepared as follows:

DISPERSANT (E) Compound marketed as Witopal CO, about 50% in methanol.

Generally, said reaction reagent may be satisfactorily prepared by the combination of about 3 to about 9 volumes of said saponification reagent, about 2 to about 4 volumes of said chelation agent, and about 2 to about 4 volumes of said dispersant. Preferably, said reaction reagent will be prepared by the combination of about 5 to 7 volumes of said saponification reagent, about 2½ to about 3½ volumes of said chelation agent, and about 2½ to about 3½ volumes of said dispersant. Most preferably, said reaction reagent will be prepared by the combination of about 6 volumes of said saponification reagent with about 3 volumes of said chelation agent and about 3 volumes of said dispersant.

As currently preferred, said fixative is constituted and prepared as follows:

FIXATIVE 0.25% of glutaraldehyde in distilled water.

The clarification of the respective milk samples by the reaction reagent is generally constituted by the change in the former from an emulsion to a substantially clear solution to enable the counting of the somatic cells therein by the cell counter 18, and may be understood to involve primarily the saponification and complexation by said saponification reagent of the said milk samples to render the fatty and other organic matrices thereof substantially undetectable by the cell counter means 18 to thus substantially prevent the former from interfering with and rendering inaccurate the counting of the somatic cells by the said cell counter means. Since chloride salts are insoluble in methanol and also tend to "salt out" protein, the HCl is removed from the $H_2NOH \cdot HCl$ by precipitation with the KOH or NaOH as the case may be, while the $H_2NOH$—KOH or $H_2NOH$—NaOH as the case may be, function primarily to saponify the milk sample fats.

The dispersant may be understood to function primarily as a saponification reagent carrier across the fat globule membranes to effectively disperse the latter and break up said fat globules into much smaller, more readily attackable particles to promote the reaction of the saponification reagent therewith.

The chelation agent functions primarily to prevent precipitation of the insoluble calcium salts of the fatty acids present in the milk samples and thus prevent the detection and counting of such precipitated salts by the cell counter.

OPERATION

For use in the clarification of milk attendant the automatic counting of the somatic cells therein for dairy cattle mastitis determination, it may be understood that each of the sample containers 24 would be filled with a sample of milk from a different cow. Preferably, each of said milk samples will have been initially fixed immediately upon removal from the cow by the addition thereto of a suitable fixative to substantially inhibit the autolysis or self-destruction of the somatic cells as would otherwise occur soon after milking, to thus insure the accuracy of the subsequent somatic cell determination.

Figure 2:
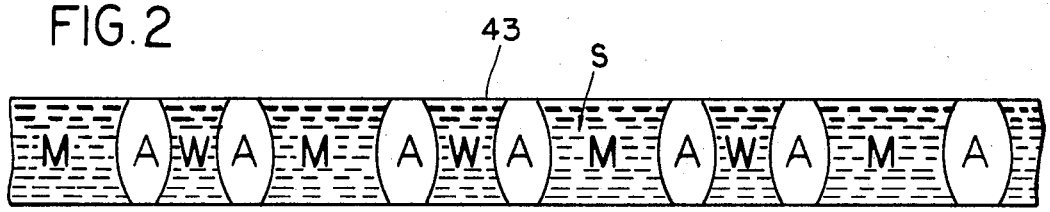
FIG. 2 is a cross-sectional view of a conduit portion of the apparatus of FIG. 1.

Operation of the apparatus of the invention is, of course, commenced by the concomitant actuation of the sample supply means 12 and the peristaltic pump 14 whereupon, once steady state operational conditions have been reached, a stream S consisting of successive samples of milk M from the successively presented sample containers 24 as spaced, in each instance, by an intervening slug of wash liquid W from the wash liquid reservoir 26 and segments of air A disposed to either side thereof, will be supplied as clearly illustrated in FIG. 2 from pump tube 42 to the portion of conduit 50 which extends just downstream of junction conduit 43, it being understood that the respective slugs of wash liquid W and segments of air A will function to cleanse the apparatus of the invention by passage therethrough to inhibit the contamination of a said milk sample by the residue of a preceding milk sample and thus provide for more consistently accurate analysis results.

Concomitantly, a stream of the fixative from container 114, as pumped through pump tube 39 and air segmented by the air pumped through pump tube 40, will also be supplied as shown to conduit 50 to merge therein with said stream S. Therefrom, the now merged milk sample-fixative stream S will flow through mixing coil 48 for thorough milk sample-fixative mixing.

As the stream S flows in conduit 50 past the juncture thereof with junction conduit 53, it may be understood that the continuously flowing stream of reaction reagent which is being pumped through the latter from reaction reagent container 116 through compressible pump tube 38, will be combined with the sample-fixative stream S, and that the thusly combined streams will flow therefrom to and through the mixing coil 48 to effect thorough milk sample-fixative-reaction reagent mixing. Therefrom, the sample stream S with the reaction reagent and fixative now suitably mixed with the respective milk samples will flow, through conduit 56, to and through the heating bath 54 to effect suitable milk sample clarification through the completion of the saponification and related reactions as discussed hereinabove.

Figure 3:
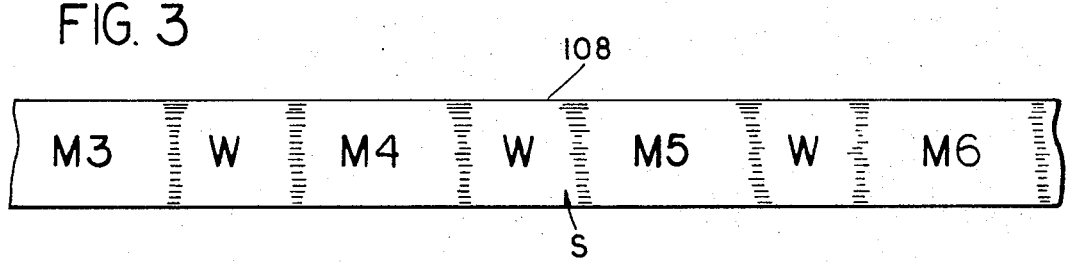
FIG. 3 is a cross-sectional view of a different conduit portion of the apparatus of FIG. 1.

The now suitably clarified stream of milk samples will flow from the outlet of heating bath 54, through conduit 62, to and through the debubbler means 58, with the result that the respective segments of air A will be removed therefrom to atmosphere by aspiration through gas outlet conduit 64, conduit 113 and pump tube 36, respectively, while the now substantially gas-free milk sample stream S which, as clearly illustrated in FIG. 3, still contains the intervening slugs of wash liquid W to generally maintain the delineation of the respective milk samples M and insure satisfactory inter sample cleansing of the particle counter flow cell inspection volume 86 to prevent significant inter sample contamination as discussed hereinabove, will flow from the debubbler means 58 through liquid outlet conduit 66 and conduit 108 to the connected particle counter flow cell 84.

Therefrom the milk sample stream S passes through the inspection volume 86 of the particle counter flow cell 84 and is aspirated therefrom for pumping to waste as indicated through the connected conduit 110 and pump tube 36, respectively.

As each of the clarified milk samples M passes in turn through the inspection volume 86 of the particle counter flow cell 64, it may be understood that the somatic cells contained therein will, in each instance, function to scatter the light from light source 70 beyond the periphery of dark stop 92 to provide a light input to photomultiplier tube 94, and resultant provision by the latter of pulse train which is indicative of the number of somatic cells in the milk sample of interest, with said pulse train being constituted by pulses of varying amplitude, width and frequency. This pulse train is applied as indicated to the pulse shaping circuit 98 for pulse shaping, and therefore to the rate circuit 100, whereby the application of the rate output of the latter is indicated to the strip chart recorder 102 will be effective to operate the same and provide a readily interpretable and reproducible permanent graph record 120 on the recorder strip chart 104, with the number of somatic cells contained in each of the milk samples as indicated for example at M3, M4, M5 and M6 in FIG. 3 being clearly and accurately indicated by the successively presented peak values of said graph as indicated at $m3$, $m4$, $m5$ and $m6$ in FIG. 1.

Operation of the apparatus of the invention is, of course, continuous until a milk sample M of predetermined volume has been withdrawn from each of the sample containers 24 and treated and analyzed as discussed hereinabove to present a graph 120 on the recorder strip chart 104 which would constitute a successive presentation of the results of the treatment and analysis of each of the milk samples M arranged in the same order as the latter are arranged in the respective sample containers 24. Utilization of the results of the operation of the apparatus of the invention would require only proper interpretation of the successively presented peaks of the graph 120 to determine whether or not, in each milk sample instance, the somatic cell level thereof exceeded the predetermined minimum level which would be indicative of a mastitis infected dairy cow.

With regard to the relative volumes of milk sample, fixative and reaction reagent introduced per milk sample to the apparatus 10 through compressible pump tubes 42, 39 and 38, it is believed clear as discussed hereinabove that the same may readily and accurately be controlled through appropriate choice in the respective internal diameters of the said pump tubes.

Preferably the volumetric ratio of fixative to milk sample will be from about 0.05 ml. to about 0.5 ml. of said fixative per from about 7 ml. to about 13 ml. of said milk sample. Most preferably, said volumetric ratio will be about 0.1 ml. of said fixative per about 10 ml. of said milk sample.

The volumetric ratio of reaction reagent to milk may be from about 15 ml. to an almost infinite amount of said reaction reagent per about 1 ml. of milk sample. Preferably, this volumetric ratio will however be about 20 ml. reaction reagent per about 1 ml. of milk sample.

Generally in determining the milk sample-reaction reagent ratio, or dilution factor, it may be understood that an effort is made to strike an overall balance in the reaction system by using the lowest concentration of reaction reagent which is compatible with accurate, reliable and timely operation of the apparatus 10. More specifically, the use, for example, of a relatively high concentration of reaction reagent may lead to mixing, corrosion, and/or pumping difficulties with regard to the operation of the apparatus and, from a reactivity standpoint, may increase the possibility of reagent incurred somatic cell destruction. On the other hand, it may be understood that the use of a relatively low concentration of said reaction reagent may result in slower fat globule dissolution to thus require increase in the heating bath residence time of the milk sample-reaction reagent mixture and/or a higher heating bath temperature with attendant increased possibility of resultant somatic cell destruction and/or apparatus inter-sample wash problems.

The transit time of the milk sample-reaction reagent-fixative stream through the heating bath 54 may, of course, be readily established in accordance with the flow rate through conduit 56 by appropriate choice of the length and/or internal diameter of the flow path therethrough, while the provision for control of the temperature of said heating bath is, of course, inherent therein. In general, it may be understood that such transit time and temperature are not critical, but rather are governed by the broad consideration that the greater the dilution factor or, that is to say, the greater the volume of reaction reagent introduced per volume of milk sample, the less heating bath transit time and the lower heating bath temperature that will be required.

For use for example within the general milk sample-reaction reagent volumetric ratio ranges provided hereinabove, it may be understood that a transit time of about 4 to about 12 minutes at a temperature of about 55° C. to about 75° C. will prove satisfactory depending upon which of said volumetric ratios is utilized. More specifically, and for use with the preferred 20 to 1 reaction reagent-milk sample volumetric ratio, said heating bath transit time will preferably be about 6 minutes while said heating bath temperature will preferably be about 60° C.

A series of examples which are believed to clearly indicate the accuracy and reliability of the method and apparatus of the invention applied as described to the automatic counting of the somatic cells in a series of milk samples are provided hereinbelow in Table A. More specifically, it may be understood that each of said examples is representative of a milk sample, the somatic cell count for a part of which was determined in accordance with the method and apparatus of this invention as appear under the heading "Optical Somatic Cell Count $\times 10^6$," and the somatic cell count for another part of which was determined by the traditional microscope and slide technique as appear under the heading "Direct Microscope Somatic Cell Count $\times 10^6$."

TABLE A

| Milk sample number: | Optical somatic cell count $\times 10^6$ | Direct microscope somatic cell count $\times 10^6$ |
|---|---|---|
| 1 | 0.4050 | 0.3800 |
| 2 | 1.87 | 1.65 |
| 3 | 7.05 | 7.34 |
| 4 | 6.75 | 6.74 |
| 5 | 0.54 | 0.59 |
| 6 | 1.94 | 1.64 |
| 7 | 0.94 | 0.84 |
| 8 | 0.39 | 0.32 |
| 9 | 2.92 | 2.24 |
| 10 | 4.20 | 3.30 |

Although the cell counter means 18 are disclosed herein as taking the form of a reverse dark field optical cell counter, it may be understood that it is considered well within the scope of this invention to utilize the method and apparatus thereof, and the novel reaction reagent thereof, in conjunction with any form of cell counter means which will accurately count the number of somatic cells in the clarified milk.

Further, and although disclosed as functioning to introduce the reaction reagent blend in a single step from container 116 through compressible pump tube 38, it may be understood that the respective saponification reagent, chelation agent and dispersant constituents thereof may be separately introduced in the relative proportions described from separate containers through separate compressible pump tubes.

In addition, and although disclosed by way of illustration as directed toward the automatic determination of the number of somatic cells in samples of milk from dairy cattle, it may be understood that the method, apparatus and novel reaction reagent of the invention would be equally applicable to such somatic cell determination for milk or like fluids from sources different than dairy cattle.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of determining the number of somatic cells in a milk sample, which comprises clarifying the milk by solubilizing the fatty and other organic constituents thereof, and detecting the number of somatic cells in the clarified milk sample.

2. A method according to claim 1, in which said solubilization is effected by mixing the milk sample with a reaction reagent which comprises a saponification reagent, a chelation agent which is capable of complexing with and solubilizing the calcium and other heavy metal salts of the fatty acids, and the proteins present in the milk, and a dispersant.

3. A method according to claim 2, in which the saponification reagent is a mixture of hydroxylamine and a strong inorganic base.

4. A method according to claim 2, in which the chelation agent is selected from the group consisting of ethylenediamine tetraacetic acid, a sodium salt thereof, mercaptoacetic acid, and ascorbic acid.

5. A method according to claim 2, in which the the dispersant is octylphenoldecaethyleneglycol ether.

6. A method according to claim 2 wherein, said saponification reagent is selected from the class consisting of $H_2NOH$—$KOH$ and $H_2NOH$—$NaOH$, and said dispersant is octylphenoldecaethyleneglycol ether.

7. A method according to claim 2 in which a stream of a series of different milk samples is formed, and a continuous stream of the reaction reagent is formed, and the reaction reagent stream is mixed with the milk sample stream.

8. A method according to claim 2, in which a fixative capable of inhibiting lysis of the somatic cells and solubilization of the latter, is mixed with the milk sample.

9. A method according to claim 8, in which the fixative is glutaraldehyde.

10. A method according to claim 6, in which a fixative capable of inhibiting lysis of the somatic cells and solubilization of the latter, is mixed with the milk sample.

11. A method according to claim 10, in which the fixative is glutaraldehyde.

12. A method according to claim 8, in which a stream of the fixative is formed, and the fixative stream is mixed with the milk samples in the milk sample stream prior to mixing of the reaction reagent stream with the milk sample stream.

13. A method according to claim 2, in which the milk-reaction reagent mixture is heated to a temperature of from 55° C. to 75° C. for from 4 to 12 minutes to effect clarification.

14. A method according to claim 13, in which the milk-reaction reagent mixture is heated at approximately 60° C. for approximately 6 minutes.

15. A reaction reagent for use in the clarification of milk which comprises, in an aqueous alcoholic medium, a saponification reagent, a chelation agent which is capable of complexing with and solubilizing the calcium and other heavy metal salts of the fatty acids, and the proteins, present in milk, and a dispersant.

16. A reaction reagent according to claim 15, in which the saponification reagent is a mixture of hydroxylamine and a strong inorganic base.

17. A reaction reagent according to claim 16, in which the saponification reagent is selected from the class consisting of $H_2NOH$—$KOH$ and $H_2NOH$—$NaOH$.

18. A method according to claim 16, in which the chelation agent is selected from the group consisting of ethylenediamine tetraacetic acid, a sodium salt thereof, mercaptocaetic acid, and ascorbic acid.

19. A reaction reagent according to claim 16, in which the dispersant is octylphenoldecaethyleneglycol ether.

20. A reaction reagent according to claim 19, in which the saponification reagent is selected from the class consisting of $H_2NOH$—$KOH$ and $H_2NOH$—$NaOH$.

References Cited

UNITED STATES PATENTS

| | | | |
|---|---|---|---|
| 3,134,263 | 5/1964 | De Jong | 73—423 A |
| 3,412,037 | 11/1968 | Gochman et al. | 252—408 |
| 3,523,733 | 8/1970 | Kling et al. | 73—61 X |
| 3,442,623 | 5/1969 | Aegidius | 23—258 |
| 961,564 | 6/1910 | Wendler | 23—231 |
| 2,863,734 | 12/1958 | Schain | 23—231 |
| 2,998,392 | 8/1961 | Schalm et al. | 23—231 X |

OTHER REFERENCES

Read, Jr., et al.: "Electronic Counting of Somatic Cells in Milk," Jour. of Dairy Science, vol. 50, pp. 669–674 (May 1967) A. U. 172.

JOSEPH SCOVRONEK, Primary Examiner

U.S. Cl. X.R.

23—253 R, 258; 252—408